United States Patent
Brumley et al.

(10) Patent No.: US 9,405,919 B2
(45) Date of Patent: Aug. 2, 2016

(54) DYNAMIC ENCRYPTION KEYS FOR USE WITH XTS ENCRYPTION SYSTEMS EMPLOYING REDUCED-ROUND CIPHERS

(71) Applicant: QUALCOMM Incorporated, San Diego, CA (US)

(72) Inventors: Billy Bob Brumley, San Diego, CA (US); Vinoth Kumar Deivasigamani, San Diego, CA (US); Satish Nithianandan Anand, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/205,230

(22) Filed: Mar. 11, 2014

(65) Prior Publication Data
US 2015/0261965 A1     Sep. 17, 2015

(51) Int. Cl.
*G06F 21/60* (2013.01)
*H04L 9/08* (2006.01)
*H04L 9/16* (2006.01)
*G09C 1/00* (2006.01)
*H04L 9/06* (2006.01)

(52) U.S. Cl.
CPC .......... *G06F 21/602* (2013.01); *G09C 1/00* (2013.01); *H04L 9/0637* (2013.01); *H04L 9/0816* (2013.01); *H04L 9/16* (2013.01); *H04L 2209/12* (2013.01); *H04L 2209/24* (2013.01); *H04L 2209/805* (2013.01)

(58) Field of Classification Search
CPC ....... G06F 21/602; H04L 9/16; H04L 9/0816; H04L 2209/24; H04L 9/0637; H04L 2209/805; G09C 1/00
See application file for complete search history.

(56) References Cited

U.S. PATENT DOCUMENTS 6,052,466 A * 4/2000 Wright .................. H04L 9/0861
                                                      380/262
6,324,286 B1 * 11/2001 Lai et al. .......................... 380/29
(Continued)

FOREIGN PATENT DOCUMENTS

WO    WO-2006063275 A1    6/2006

OTHER PUBLICATIONS

Sashank et al., Index Based Symmetric Block Encryption, Mar. 2011, 2nd National Conference on Emerging Trends and Applications in Computer Science, pp. 1-6.*

(Continued)

*Primary Examiner* — Kenneth Chang
(74) *Attorney, Agent, or Firm* — Loza & Loza, LLP

(57) ABSTRACT

One feature pertains to encrypting data to improve data confidentiality. In one aspect, a modified form of XTS encryption is provided for use with reduced-round block ciphers. A data unit index of data to be applied to the reduced-round cipher is encrypted under a secret key to generate or otherwise obtain a modified secret key for applying to the reduced-round cipher. That is, data to be encrypted by the reduced-round cipher is not encrypted under a static key but is instead encrypted under a dynamic key that varies according to the index of the data. If an attacker were to derive the value of the key applied to the reduced-round cipher by analyzing data encrypted by the cipher, the attacker would only obtain the dynamic key corresponding to one particular data unit index, rather than a global static key applied to an entire address space. Decryption procedures are also described.

32 Claims, 16 Drawing Sheets

XTS Encryption with Dynamic Key$_1$ applied to Reduced-Round Block Encryption Cipher

(56) References Cited

U.S. PATENT DOCUMENTS

| | | | |
|---|---|---|---|
| 7,472,285 B2 | 12/2008 | Graunke et al. | |
| 8,494,155 B1* | 7/2013 | Poo | H04L 9/0631 380/28 |
| 8,578,156 B2 | 11/2013 | Goto | |
| 2003/0223580 A1* | 12/2003 | Snell | 380/28 |
| 2005/0175175 A1* | 8/2005 | Leech | H04L 9/0637 380/29 |
| 2006/0195402 A1* | 8/2006 | Malina | G06F 21/10 705/50 |
| 2008/0019503 A1* | 1/2008 | Dupaquis et al. | 380/28 |
| 2008/0226063 A1* | 9/2008 | Hall et al. | 380/28 |
| 2008/0270505 A1* | 10/2008 | Bolotov | G06F 7/724 708/492 |
| 2009/0060197 A1 | 3/2009 | Taylor et al. | |
| 2010/0098255 A1* | 4/2010 | Ciet | H04L 9/0838 380/277 |
| 2010/0115286 A1* | 5/2010 | Hawkes | G06F 12/1408 713/189 |
| 2010/0183146 A1* | 7/2010 | Leech | H04L 9/0637 380/28 |
| 2011/0311048 A1 | 12/2011 | Nagata et al. | |
| 2012/0314857 A1 | 12/2012 | Minematsu | |

OTHER PUBLICATIONS

Dworkin M., "NIST Special Publication 800-38E: Recommendation for Block Cipher Modes of Operation: The XTS-AES Mode for Confidentiality on Storage Devices", NIST Special Publication 800-38E, Jan. 1, 2010, 12 Pages, XP055190724, Retrieved from the Internet: URL: http://csrc.nist.gov/publications/nistpubs/800-38E/nist-sp-800-38E.pdf [retrieved on May 21, 2015].

International Search Report and Written Opinion—PCT/US2015/018357—ISA/EPO—Jun. 1, 2015.

"The XTS-AES Tweakable Block Cipher an Extract from IEEE Std 1619-2007 2 Extracted from IEEE Std", Apr. 18, 2008, 24 Pages, XP055198746, Retrieved from the Internet: URL: http://luca-giuzzi.unibs.it/corsi/Support/papers-cryptography/1619-2007-NIST-Submission.pdf [retrieved on May 21, 2015] the whole document.

* cited by examiner

*Example of XTS Decryption using a Reduced-Round Decryption Cipher with Dynamically Generated $K_1$*

801 — Fetch ciphertext data from off-chip storage device such as a DDR RAM for decryption.

802 — While fetching, encrypt n-bit data unit index corresponding to a page of data to be decrypted under the first key ($K_1$) using a full block cipher to obtain a modified first key ($K_1'$), wherein the encryption of data unit index is performed in parallel with operations to fetch data to be decrypted.

804 — While fetching, encrypt the n-bit data unit index under a second key ($K_2$) using a second instance of the same full block cipher to obtain a modified second key V.

806 — While fetching, apply the block index j to V to obtain the whitening key by multiplying V with $a^j$ -- wherein a is the constant value and j represents a block index offset within the page of data corresponding to the data to be decrypted.

808 — Apply the whitening key to the data to be decrypted -- prior to applying the data to a reduced-round decryption cipher -- by XORing the whitening key with the data to be decrypted 810 — Decrypt the whitened data under the modified first key ($K_1'$) using the reduced-round decryption cipher.

812 — Re-apply the whitening key to the output of the reduced-round decryption cipher by XORing the whitening key with data output from the reduced-round decryption cipher to obtain decrypted plaintext data and pass on to a requestor.

*FIG. 8*

*Summary of Encryption for use with Reduced-Round Encryption Cipher*

DYNAMIC ENCRYPTION KEYS FOR USE WITH XTS ENCRYPTION SYSTEMS EMPLOYING REDUCED-ROUND CIPHERS

BACKGROUND

1. Field

Various features relate to encryption, particularly encryption exploiting XTS block cipher modes for use with mobile computing devices.

2. Background

Block ciphers are employed in cryptography to improve the confidentiality of data stored within memory systems or other storage systems, particularly memory systems accessible by an attacker or other malicious entity. Typically, block ciphers employ a deterministic procedure or algorithm that operates on fixed-length groups of bits (i.e. blocks.) Block ciphers may be employed to implement the encryption of bulk data, such as data stored on off-chip memory devices used with System-on-a-Chip (SoC) processors of smartphones or other mobile computing devices. One example of a block cipher mode of operation is XTS-AES specified by the Institute of Electrical and Electronics Engineers (IEEE) Standard 1619-2007. See also National Institute of Standards and Technology (NIST) Special Publication 800-38E, "Recommendation for Block Cipher Modes of Operation: The XTS-AES Mode for Confidentiality on Storage Devices", June 2010. Note that XTS stands for "XEX Tweakable Block Cipher with Ciphertext Stealing" and XEX stands for "XOR Encrypt XOR." AES refers to Advanced Encryption System.

Briefly, the XTS-AES mode is intended for the cryptographic protection of data on storage devices that use fixed length "data units." The standard XTS block cipher mode uses fixed keys $K_1$ and $K_2$ that are intended to be kept secret and where, generally speaking, $K_1$ operates on the data and $K_2$ operates on the corresponding data unit indices. For certain applications, such as the retrieval of data stored on the memory devices of smartphones, the block cipher function utilizing $K_1$ may be "stripped down" by reducing the number of rounds employed by the cipher to allow it to operate more quickly so as to reduce overall read latency. Such block ciphers are referred to as reduced-round block ciphers. In this regard, block ciphers may use invertible transformations known as round functions, where each iteration is referred to as a round. A reduced-round cipher may employ a truncated or reduced number of such rounds, e.g. sixteen rounds or iterations rather than thirty-two, relative to a full block cipher. Reduced-round ciphers, however, may render at least some of the keys less secure.

Therefore, there is a need to improve the confidentiality of data stored within storage systems such as memory systems accessible by an attacker or other malicious entity, particularly data encrypted using reduced-round ciphers.

SUMMARY

In one aspect, a method for encrypting data for use with a reduced-round encryption cipher includes: encrypting a data unit index based on a first key using a first block cipher to obtain a modified first key, wherein the data unit index corresponds to data to be encrypted by the reduced-round encryption cipher; encrypting the data based on the modified first key using the reduced-round encryption cipher; and storing the encrypted data in a storage device.

In another aspect, a device includes a storage device to store data and a processing circuit coupled to the storage device configured to: encrypt a data unit index based on a first key using a first block cipher to obtain a modified first key, wherein the data unit index corresponds to data to be encrypted by a reduced-round encryption cipher; encrypt the data based on the modified first key using the reduced-round encryption cipher; and store the encrypted data in the storage device.

In yet another aspect, a method for decrypting data for use with a reduced-round decryption cipher includes: encrypting a data unit index based on a first key using a first block cipher to obtain a modified first key, wherein the data unit index corresponds to data to be decrypted by the reduced-round decryption cipher; decrypting the data based on the modified first key using the reduced-round decryption cipher; and storing the decrypted data in a storage device.

In still yet another aspect, a device includes a storage device to store data and a processing circuit coupled to the storage device configured to: encrypt a data unit index based on a first key using a first block cipher to obtain a modified first key, wherein the data unit index corresponds to data to be decrypted by a reduced-round decryption cipher; decrypt the data based on the modified first key using the reduced-round decryption cipher; and store the decrypted data in a storage device.

BRIEF DESCRIPTION OF THE DRAWINGS

FIG. 8 is a block diagram illustrating an exemplary decryption method for use in decrypting data previously encrypted using the procedure of FIGS. 4-7.

DETAILED DESCRIPTION

Figure 1:
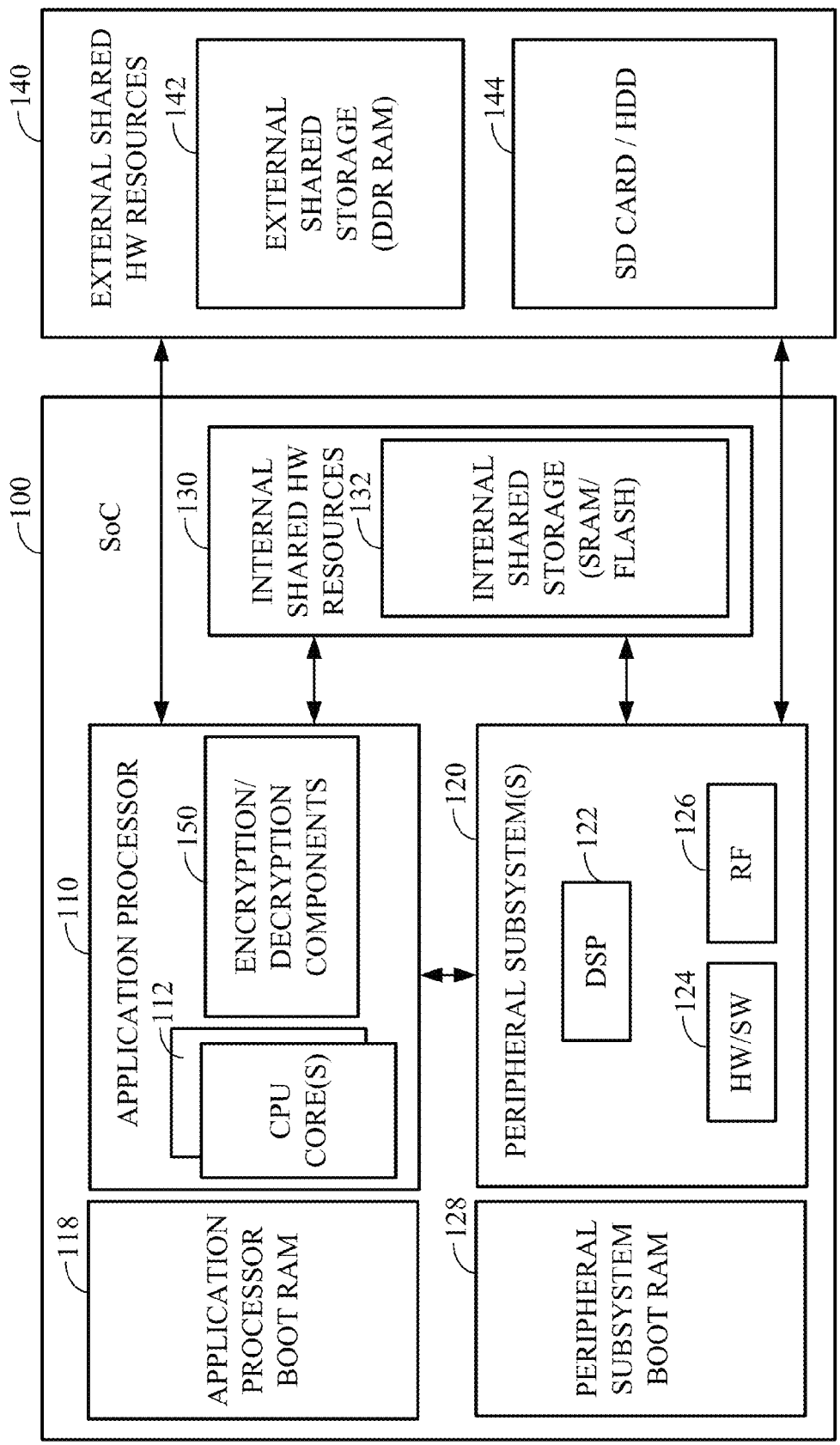
FIG. 1 illustrates a block diagram of a system on a chip (SoC) processor of a mobile communication device in accordance with an illustrative example.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to encrypting data for storage in storage devices to preserve the confidentiality of the data. The novel features may be used in system-of-a-chip (SoC) devices but are applicable in a wide range of systems, apparatus and devices and to achieve a variety of goals.

In one aspect, an encryption/decryption component of a SoC processor encrypts/decrypts data using a modified form of an XTS block cipher where one cipher instance is a "stripped down" reduced-round cipher and where two keys ($K_1$ and $K_2$) are used in the encryption/decryption of data unit indices or tweaks, such as page indices. A reduced-round cipher employs a truncated or reduced number of rounds relative to a full block cipher, where the number of rounds of the corresponding full block cipher is specified or defined by a given encryption standard such as AES or may be implicitly or explicitly determined by the mathematics of the particular block cipher being used. In one example, a full-round cipher might employ thirty-two rounds whereas the reduced-round version employs only eight. As noted, generally speaking, $K_1$ operates on data and $K_2$ operates on data unit indices such as pages. When employing such as stripped down cipher function, $K_1$ can be at risk of disclosure to malicious entities. For example, data encrypted using a reduced-round encryption cipher and then stored in memory can be analyzed by an attacker to potentially determine the value for $K_1$ because a full cipher was not used. If $K_1$ is compromised, all the data within an address space associated with the storage device is likewise compromised. The confidentiality of $K_1$, and hence the confidentiality of data encrypted using $K_1$, can be improved by the procedures described herein wherein the data unit index (or page number) is dynamically encrypted under $K_1$ using a full block cipher to generate or otherwise obtain a modified key (herein denoted $K_1'$), which is then employed to encrypt the data using the reduced-round encryption cipher. That is, rather than directly applying $K_1$ to the reduced-round encryption cipher to encrypt the data (which may also be whitened using the output of the cipher instance utilizing $K_2$ in accordance with XTS), exemplary procedures described herein apply a modified and dynamically obtained version of $K_1$ (i.e., $K_1'$) to the reduced-round encryption cipher. Note that, herein, "obtaining" broadly covers, e.g., generating, acquiring, receiving, retrieving or performing any other suitable corresponding actions. If an attacker thereafter determines the value of $K_1'$, then only the data corresponding to the particular data unit index used to generate $K_1'$ is compromised, rather than all data in the entire address space, since other data units are encrypted with different versions of $K_1'$ based on different data unit indices or tweaks.

In this regard, consider a system that stores data in data units (or pages). XTS as a mode may be employed to operate as follows:

$$V = F_1(K_2, i)$$

$$W = F_2(j; V)$$

$$C_j = F_3(K_1, P_j \oplus W) \oplus W$$

where value W is an input and output whitening key, i is the data unit index, j is the block index (i.e., offset within the data unit) of data P to be encrypted and $\oplus$ represents an exclusive-OR (XOR) operation. Note that V depends on i but not j, i.e., in this example all blocks within a data unit share the same V and various optimizations may be employed to compute V only once for consecutive operations within a single data unit. Standard AES-XTS may be obtained by setting F1 and F3 to AES-128 (E) and $F_2(j, a) = a \cdot x^j$ in $F_{2^{128}}$ so that the above simplifies as follows:

$$C_j = E_{K_1}(P_j \oplus (E_{K_2}(i) \cdot x^j)) \oplus (E_{K_2}(i) \cdot x^j).$$

This standard XTS mode can be regarded as encryption of plaintext $P_j$ under a fixed key $K_1$ with an additional input/output "whitening key" derived from encrypting the data unit index (i) under key $K_2$. One feature of XTS is that encryption is position-dependent. As such, attackers cannot copy and paste data to different locations and preserve the plaintext in any useful way. Data can only be copied and pasted to the same location. Regarding confidentiality, note that XTS is not nonce-based (where nonce means "number used once") but nevertheless resists traditional Electronic Code Book (ECB)-like analysis in the following manner. In traditional ECB, plaintext P written to addresses $A_1$ and $A_2$ (where $A_1 \neq A_2$) under the same key will yield the same ciphertext C. With XTS, the whitening keys will differ resulting in ciphertexts $C_1$ and $C_2$ with $C_1 \neq C_2$. To summarize, ECB-like analysis on XTS is typically restricted to a single address (specifically an i and j combination) as opposed to the entire address space. (In this regard, P always encrypts to $C_1$ at $A_1$ but a different $C_2$ at a different $A_2$.)

In at least some exemplary procedures described herein, a modified form of the XTS more of operation is provided that sets:

$$K_1' = F_4(K_1, i)$$

$$C_j = F_3(K_1', P_j \oplus W) \oplus W$$

Note that F4=F1 is an exemplary, and perhaps preferable, variation or implementation. This modified XTS mode can be regarded as encryption of plaintext $P_j$ under a dynamic key $K_1'$ with an additional input/output "whitening key" derived from encrypting the data unit index (i) under key $K_2$. Dynamically deriving $K_1'$ per data unit puts only the data in that particular data unit at potential risk. Data may be subsequently decrypted by generally reversing the process with the same keys and indices to again obtain the plaintext. In many applications, such as reads in memory decryption, the hardware obtains i before it obtains $P_j$, i.e. the processing device obtains the address before it fetches the data to be decrypted. The processing device can thereby use the latency therebetween to operate on i with $F_1$ and $F_4$ to compute V and $K_1'$ while the data to be decrypted is being fetched from memory.

A note on terminology: herein $K_1'$ is used to denote the output of the first block cipher that encrypts the data unit index for use as the key to the reduced-round encryption and decryption ciphers and is referred to as a modified version of the first key $K_1$. This terminology is used since $K_1'$ is applied to the reduced-round cipher in the place of the static key $K_1$. The terminology is arbitrary and this value could instead be referred to using other terms. The letter V is primarily used herein to denote the output of the second block cipher that is employed to generate or otherwise obtain the whitening key. This terminology is used to be consistent with otherwise standard XTS encryption terminology. Again, however, the terminology is arbitrary and this value could instead be referred to using other terms. In some cases, V is additionally or alternatively referred to herein as a modified version of the second key $K_2$.

Exemplary System-on-a-Chip Hardware Environment

FIG. 1 illustrates a system-on-a-chip (SoC) processor device 100 of a mobile communication device in accordance with one example where various novel features may be exploited. The SoC processor may be a Snapdragon™ processor manufactured by Qualcomm Incorporated. SoC processor 100 includes an application processor 110, which includes a multi-core CPU 112. Application processor 110 typically controls the operation of all components of the mobile communication device. In one aspect, application processor 110 includes encryption/decryption components 150 equipped to perform modified XTS encryption/decryption employing dynamically generated keys, such as the aforementioned dynamically generated $K_1'$ key. Application processor 110 may include a boot read-only memory (ROM) 118 that stores boot sequence instructions for the various components of SoC processor 100. SoC processor 100 further includes one or more peripheral subsystems 120 controlled by application processor 110. Peripheral subsystems 120 may include but are not limited to a storage subsystem (e.g., read-only memory (ROM), random access memory (RAM)), a video/graphics subsystem (e.g., digital signal processor (DSP), graphics processor unit (GPU)), an audio subsystem (e.g., DSP, analog-to-digital converter (ADC), digital-to-analog converter (DAC)), a power management subsystem, security subsystem (e.g., encryption, digital rights management (DRM)), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). Exemplary peripheral subsystem 120, which is a modem subsystem, includes a DSP 122, various hardware (HW) and software (SW) components 124, and various radio-frequency (RF) components 126. In one aspect, each peripheral subsystem 120 also includes a boot ROM 128 that stores a primary boot image (not shown) of the associated peripheral subsystems 120.

SoC processor 100 further includes various internal shared HW resources 130, such as an internal shared storage 132 (e.g. static RAM (SRAM), double-data rate (DDR) and/or synchronous dynamic (SD) RAM, DRAM, Flash memory, etc.), which is shared by application processing circuit 110 and various peripheral subsystems 120 to store various runtime data. In one aspect, components 110, 118, 120, 128 and 130 of SoC processing circuit 100 are integrated on a single-chip substrate. SoC processing circuit 100 further includes various external shared HW resources 140, which may be located on a different chip substrate and communicate with the SoC processing circuit 100 via a system bus (not shown.) External shared HW resources 140 may include, for example, an external shared storage device 142 (e.g. DDR RAM, DRAM, Flash memory) and/or permanent data storage 144 (e.g., a Secure Digital (SD) card or Hard Disk Drive (HDD), etc.), which are shared by application processing circuit 110 and various peripheral subsystems 120 to store various types of data, such as an operating system (OS) information, system files, programs, applications, user data, audio/video files, etc. When the mobile communication device incorporating the SoC is activated, secure SoC processing circuit 100 begins a system boot up process. In particular, application processing circuit 110 accesses boot ROM 118 to retrieve or obtain boot instructions for SoC processing circuit 100, including boot sequence instructions for various peripheral subsystems 120. Peripheral subsystems 120 may also have additional peripheral boot ROM 128.

Exemplary XTS-Based Encryption Procedures without a Dynamic $K_1$ Key

Figure 2:
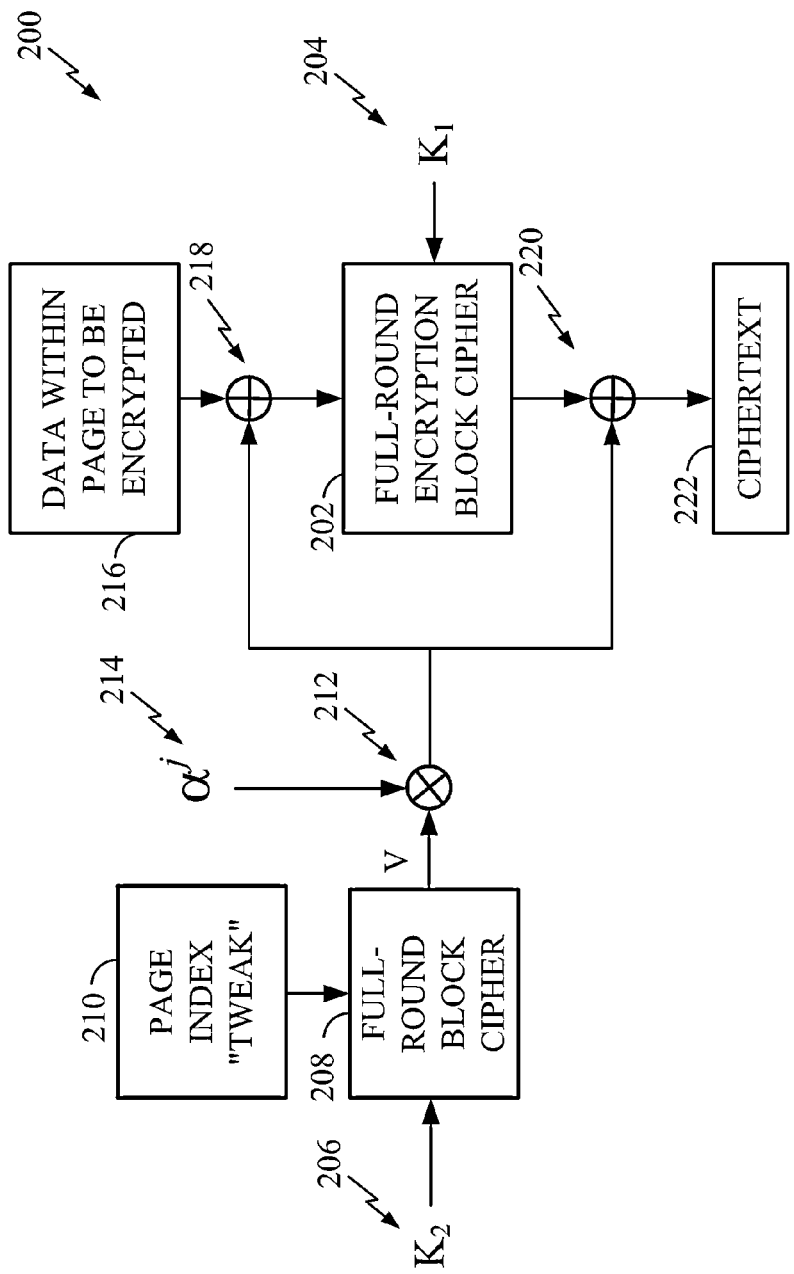
FIG. 2 illustrates an exemplary XTS block cipher encryption procedure employing a full-round block cipher wherein first and second secret keys are employed.

FIG. 2 illustrates an exemplary procedure 200 that may be employed by the SoC processing circuit of FIG. 1, or other suitable-equipped devices, systems or processing circuits, that uses a full-round encryption block cipher 202 for encrypting data in combination with a static $K_1$ key 204 and a static $K_2$ key 206. This implementation may be used, for example, in systems in which read latency is not an issue during decryption so that a full-round cipher may be employed both during encryption and subsequent decryption. Again, see IEEE Standard 1619-2007. In this mode, a full-round block cipher 208 is used to encrypt a page index 210 (which may be 128 bits) under $K_2$ key 206 (in which the page index may also be referred to as a "tweak.") The output of block cipher 208, which is denoted V and may be regarded as a modified version of $K_2$, is multiplied at 212 with $\alpha^j$ 214 to provide an input/output whitening value, wherein $\alpha$ is a constant and j represents a block index (which may be an offset within the page of data to be encrypted.) The data to be encrypted 216 is then XORed at 218 with the whitening value and input to full-round encryption cipher 202 as "whitened" data. The whitened data is then encrypted under $K_1$ by the full-round encryption cipher. The input/output whitening value generated by XOR function 212 is then XORed at 220 with the output data from the full block cipher to yield the final ciphertext 222, which may be stored, for example, in an off-chip storage device of the type shown in FIG. 1 or some other suitable storage location. These procedures may be reversed to decrypt ciphertext back to plaintext using a full-round decryption cipher.

Figure 3:
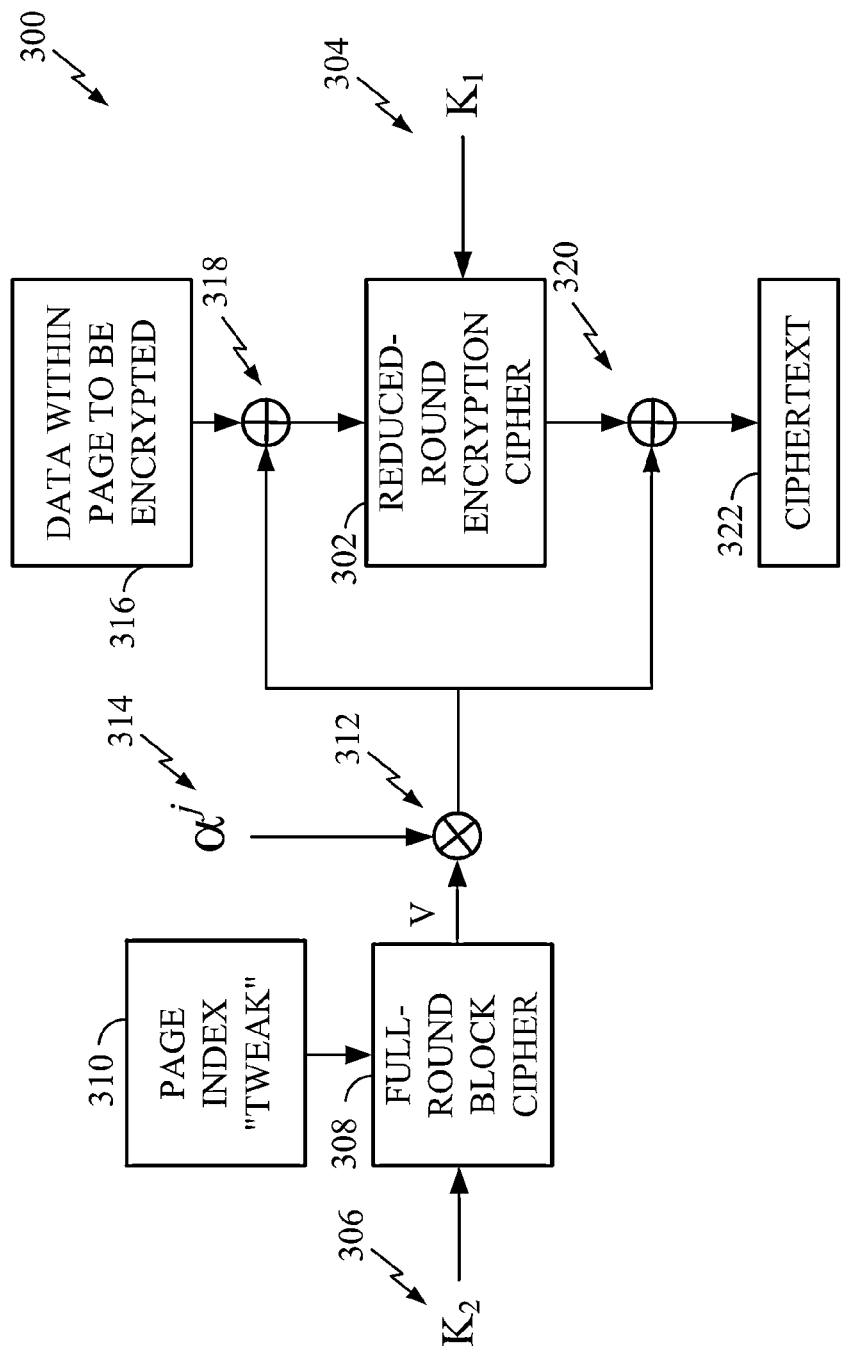
FIG. 3 illustrates an exemplary XTS block cipher encryption procedure wherein a reduced-round block cipher is employed.

FIG. 3 illustrates an exemplary procedure 300 that may be employed by the SoC processing circuit of FIG. 1, or other suitable-equipped devices, systems or processing circuits, that uses a reduced-round encryption cipher 302 for encrypting data, again in combination with a static $K_1$ key 304 and a static $K_2$ key 306. This implementation might be used, for example, in systems in which read latency is an issue during decryption but where the risk of disclosure of $K_1$ is not deemed significant. Many of the features of the mode of operation of FIG. 3 are the same or similar to that of FIG. 2 and hence will only briefly be described. Again, a full-round block cipher 308 is used to encrypt a page index 310 under a $K_2$ key 306. The output V is multiplied at 312 with $\alpha^j$ 314 to provide an input/output whitening value. The data to be encrypted 316 is then XORed at 318 with the whitening value and input to reduced-round encryption cipher 302 as whitened data. The whitened data is then encrypted under static key $K_1$ by the reduced-round encryption cipher. The whitening value is then XORed at 320 with the output data from the reduced-round encryption cipher to yield the final ciphertext 322. The procedures may be reversed to decrypt ciphertext back to plaintext using a reduced-round decryption cipher. Since reduced-round ciphers are used rather than full block ciphers, key $K_1$ is at risk along with, potentially, all data within the address space of the data.

Exemplary XTS-Based Encryption Procedures with a Dynamic $K_1$ Key

Figure 4:
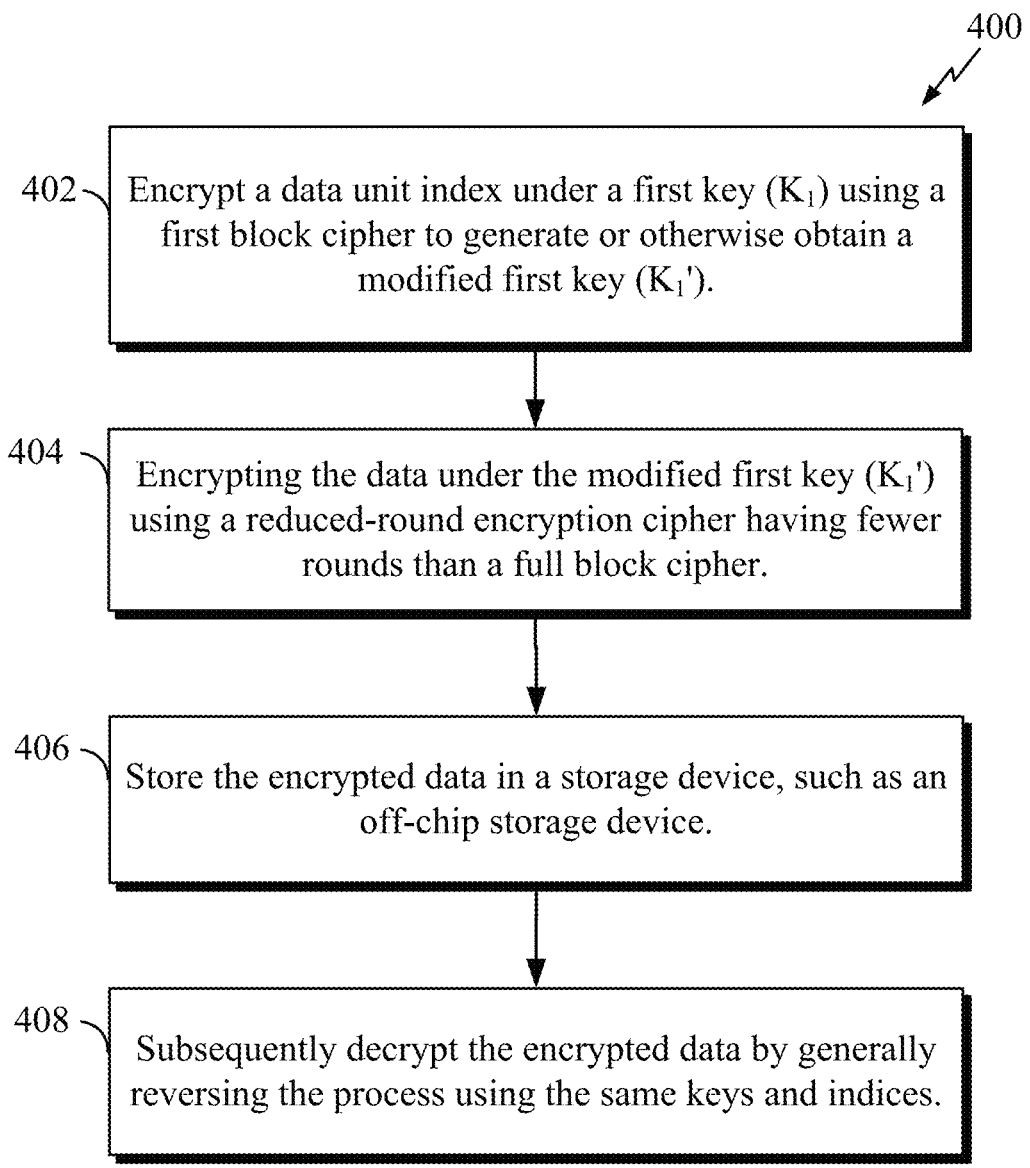
FIG. 4 provides an overview of a modified XTS encryption procedure wherein the first key, as well as the second (whitening) key, is dynamically obtained.

FIG. 4 provides an overview of a procedure 400 that may be employed by the SoC processing circuit of FIG. 1, or other suitable-equipped devices, systems or processing circuits, for improving data confidentiality by employing a dynamically generated (or otherwise dynamically obtained) key $K_1'$ for use with XTS ciphers. At step 402, a data unit index is dynamically encrypted under (or "based on" or "using," etc.) a first key ($K_1$) using a first block cipher to generate or otherwise obtain a modified first key $K_1'$. At step 404, data is encrypted under the modified first key ($K_1'$) using a reduced-round encryption cipher having fewer rounds than a full block cipher. At step 406, the encrypted data (e.g. ciphertext) is stored in a storage device, such as an off-chip memory device. By using a dynamically generated key $K_1'$ with the reduced-round encryption cipher, rather than a static key, only data within the data unit associated with the index used to generate the $K_1'$ key is at risk if the $K_1'$ key is disclosed or obtained by an attacker, as opposed to all of the data within the address space associated with the data unit indices, i.e. within all pages of the address space. As shown in step 408, data may be subsequently decrypted by generally reversing the process with the same keys and indices to reveal or re-generate the original data (e.g. plaintext.)

Figure 5:
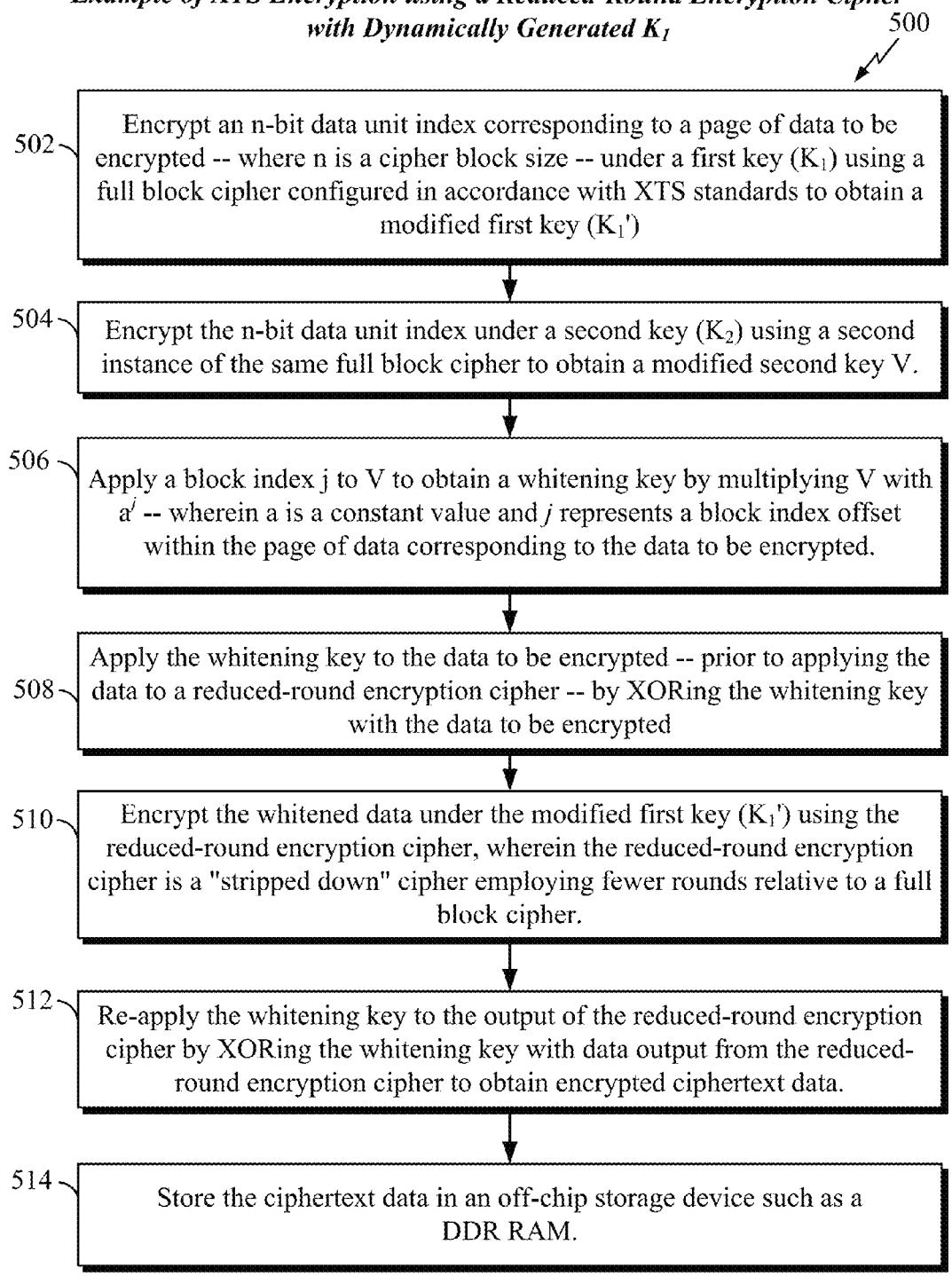
FIG. 5 is a block diagram illustrating an exemplary method for use with the encryption procedure of FIG. 4 wherein the first key is dynamically obtained for each new write operation for use with a SoC processor system.

FIG. 5 illustrates the exemplary encryption procedure of FIG. 4 in greater detail where, again, the procedure may be employed by the SoC processing circuit of FIG. 1, or other suitable-equipped devices, systems or processing circuits. The procedure 500 of FIG. 5 begins at step 502 with the processing circuit encrypting an n-bit data unit index parameter, where the index corresponds to a page of data to be encrypted where n is the block size of the cipher, e.g. the data unit index identifies a memory storage location containing data to be encrypted. That is, the terminology used herein to indicate that a data unit index "corresponds" to a data unit broadly means that the data unit index identifies the data unit or a portion thereof or is otherwise similarly associated with the data unit or a portion thereof. In the examples herein, the data unit index is typically a page index. The data unit index is encrypted under the first key ($K_1$) using a full-round block cipher to generate or otherwise obtain a modified first key ($K_1'$.) At step 504, the processing circuit encrypts the n-bit data unit index under the second key ($K_2$) using a second instance of the same full-round block cipher to generate or otherwise obtain a modified second key, denoted V. At step 506, the processing circuit applies a block index j to V to generate a whitening key by multiplying V with $\alpha^j$, wherein $\alpha$ is a constant and j represents the block index offset within the page of data. At step 508, the processing circuit then applies the whitening key to the data to be encrypted (prior to inputting the data into a reduced-round encryption cipher) by XORing the whitening key with the data to be encrypted. The data to be encrypted may be obtained, e.g., from an on-chip SRAM. At step 510, the processing circuit encrypts the whitened data under the modified first key using the reduced-round encryption cipher, wherein the reduced-round encryption cipher is a "stripped down" cipher employing a reduced number of rounds relative to a full block cipher. At step 512, the processing circuit re-applies the whitening key to the output of the reduced-round data cipher to generate encrypted ciphertext data by XORing the whitening key with data output from the reduced-round encryption cipher. Thereafter, at step 514, the cipher text is then stored in an off-chip storage device such as a DDR RAM or other suitable storage devices.

The storage may be temporary or transient, with the encrypted data then transmitted to another device such as another mobile computing device, or other appropriate actions can be taken. Again, with $K_1'$ dynamically generated based on the data unit index, only data within that particular data unit is at risk if $K_1'$ is disclosed, as opposed to all of the data within the address space.

Figure 6:
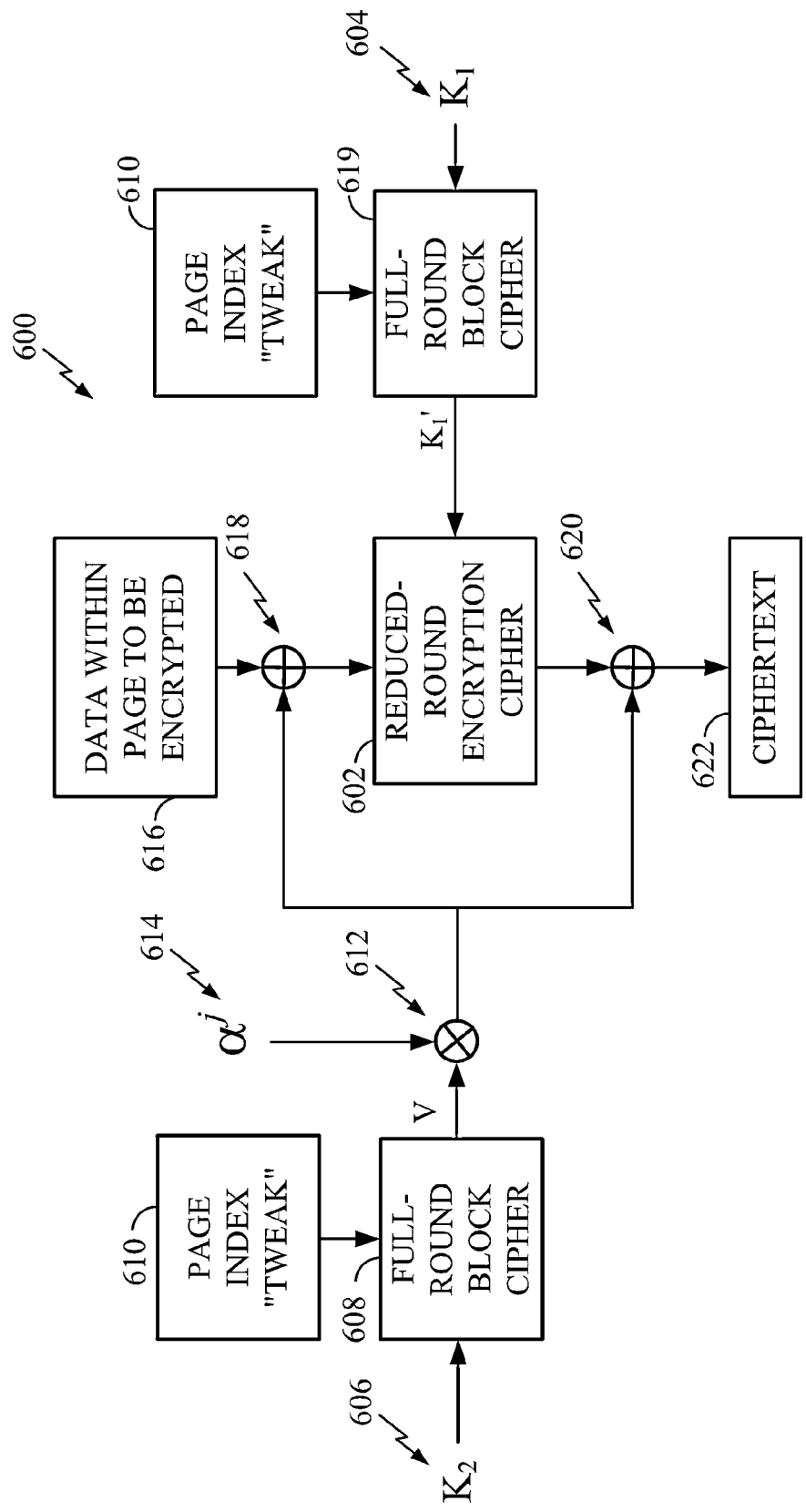
FIG. 6 further illustrates aspects of the encryption procedure of FIG. 4.

FIG. 6 illustrates an exemplary procedure 600 that may be employed in accordance with the method of FIG. 5 that uses a reduced-round block encryption cipher 602 for encrypting data in combination with $K_1$ key 604 and $K_2$ key 606. In this mode, a full-round block cipher 608 is used to encrypt a page index 610 (e.g. 128-bit) under $K_2$ key 606. The output V of block cipher 608, which may be regarded as a modified version of $K_2$, is multiplied at 612 with $\alpha^j$ 614 to provide an input/output whitening value, wherein $\alpha$ is a constant and j represents a block index (which may be an offset within the page of data to be encrypted.) The data to be encrypted 616 is then XORed at 618 with the whitening value and input to reduced-round encryption cipher 602 as "whitened" data. Concurrently, the same page index 610 is also encrypted under key ($K_1$) using a full-round cipher 619, which can be the same form of cipher as full-round cipher 608. The output ($K_1'$) of block cipher 619, which may be regarded as a modified version of $K_1$, is employed as the key for reduced-round encryption cipher 602, as shown. That is, the whitened data is then encrypted under the modified version of $K_1$ by the reduced-round encryption cipher 602. The input/output whitening value generated by multiply function 612 is then XORed at 620 with the output data from the reduced-round encryption cipher to yield the final ciphertext 622, which may be stored, for example, in an off-chip storage device of the type shown in FIG. 1 or at some other suitable storage location. Note that, in the example of FIG. 6, at least two processes may be performed in parallel: cipher instance with $K_1$ fires while cipher instance with $K_2$ fires.

Figure 7:
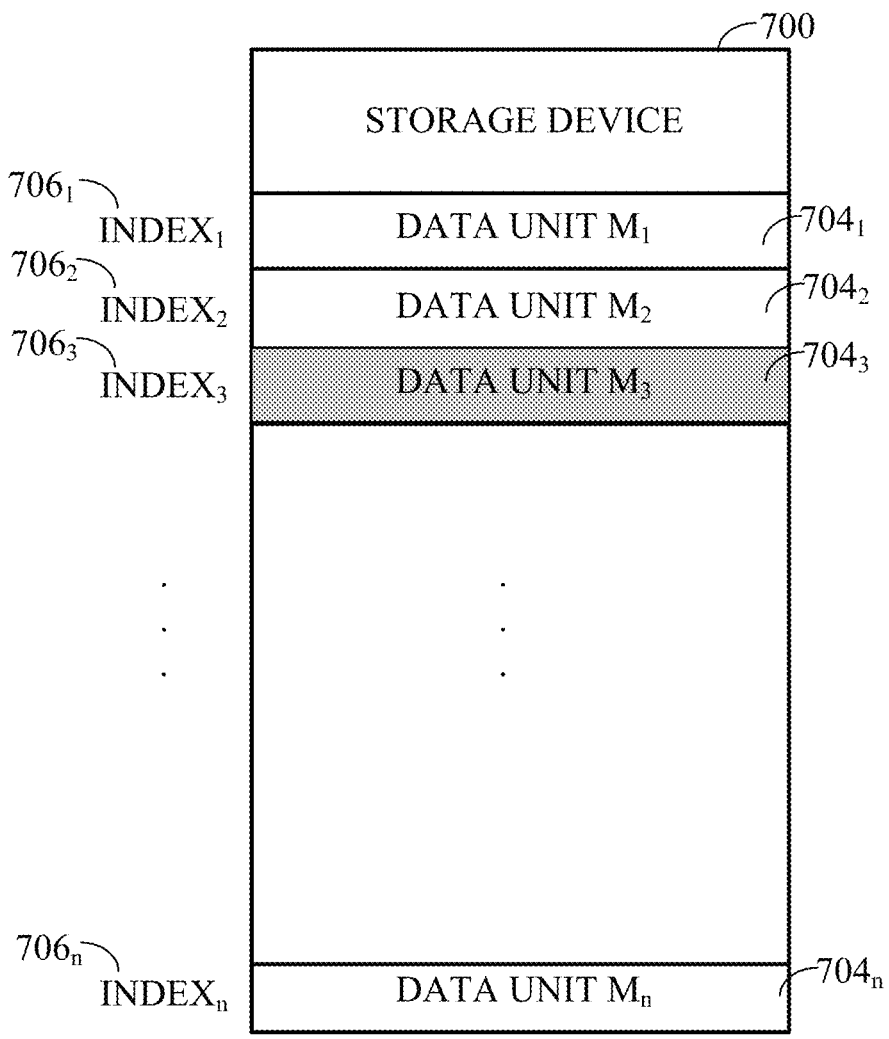
FIG. 7 is a block diagram illustrating an example of a storage device for use with the systems, methods and apparatus of FIGS. 1-6.

FIG. 7 illustrates an exemplary storage device 700, such as an off-chip storage device. Storage device 700 stores the latest versions of data units $M_1 \ldots M_n$, individually denoted by reference numerals $704_1 \ldots 704_n$, where each data unit may represent a page of data within an address space of the off-chip storage. The storage device uses corresponding page indices for the data unit $INDEX_1 \ldots INDEX_n$, individually denoted by reference numerals $706_1 \ldots 706_n$. If the $K_1'$ key generated based on $INDEX_3$ were compromised, the data within the corresponding data unit ($M_3$) would be at risk, as shown by the shaded block $704_3$, but the rest of the data in the overall address space would not thereby be at risk.

Exemplary XTS-Based Decryption Procedures with a Dynamic $K_1$ Key

FIG. 8 illustrates an exemplary decryption procedure for use in subsequently decrypting ciphertext where, again, the procedure may be employed by the SoC processing circuit of FIG. 1, or other suitable-equipped devices, systems or processing circuits. The procedure 800 of FIG. 8 begins at step 801 where data to be decrypted is fetched from a storage device such as off-chip DDR RAM. At step 802 while the data is being fetched, the processing circuit encrypts an n-bit data unit index, where the index corresponds to a page of data to be decrypted where n is the block size of the cipher. The data unit index is encrypted under the first key ($K_1$) using a full-round block cipher to generate or otherwise obtain a modified first key ($K_1'$.) At step 804, while the data is being fetched, the processing circuit encrypts the n-bit data unit index under the second key ($K_2$) using a second instance of the same full-round block cipher to generate or otherwise obtain a modified second key, denoted V. At step 806, while still fetching, the processing circuit applies a block index j to V to generate a whitening key by multiplying V with $\alpha^j$, wherein $\alpha$ is again the constant value and j represents the block index offset within the page of data to be decrypted. At step 808, the processing circuit then applies the whitening key to the fetched data to be decrypted (prior to inputting the data into a reduced-round decryption cipher) by XORing the whitening key with the data to be decrypted. At step 810, the processing circuit decrypts the whitened data under the modified first key using the reduced-round decryption cipher, wherein the reduced-round decryption cipher is again a "stripped down" cipher employing a reduced number of rounds relative to a full block cipher. At step 812, the processing circuit re-applies the whitening key to the output of the reduced-round decryption cipher to generate decrypted plaintext data by XORing the whitening key with data output from the reduced-round decryption cipher to obtain plaintext and pass on to a requestor. In this regard, the plaintext may be stored in an on-chip storage device such as an SRAM for use by components of the device. The storage again may be temporary or transient.

Figure 9:
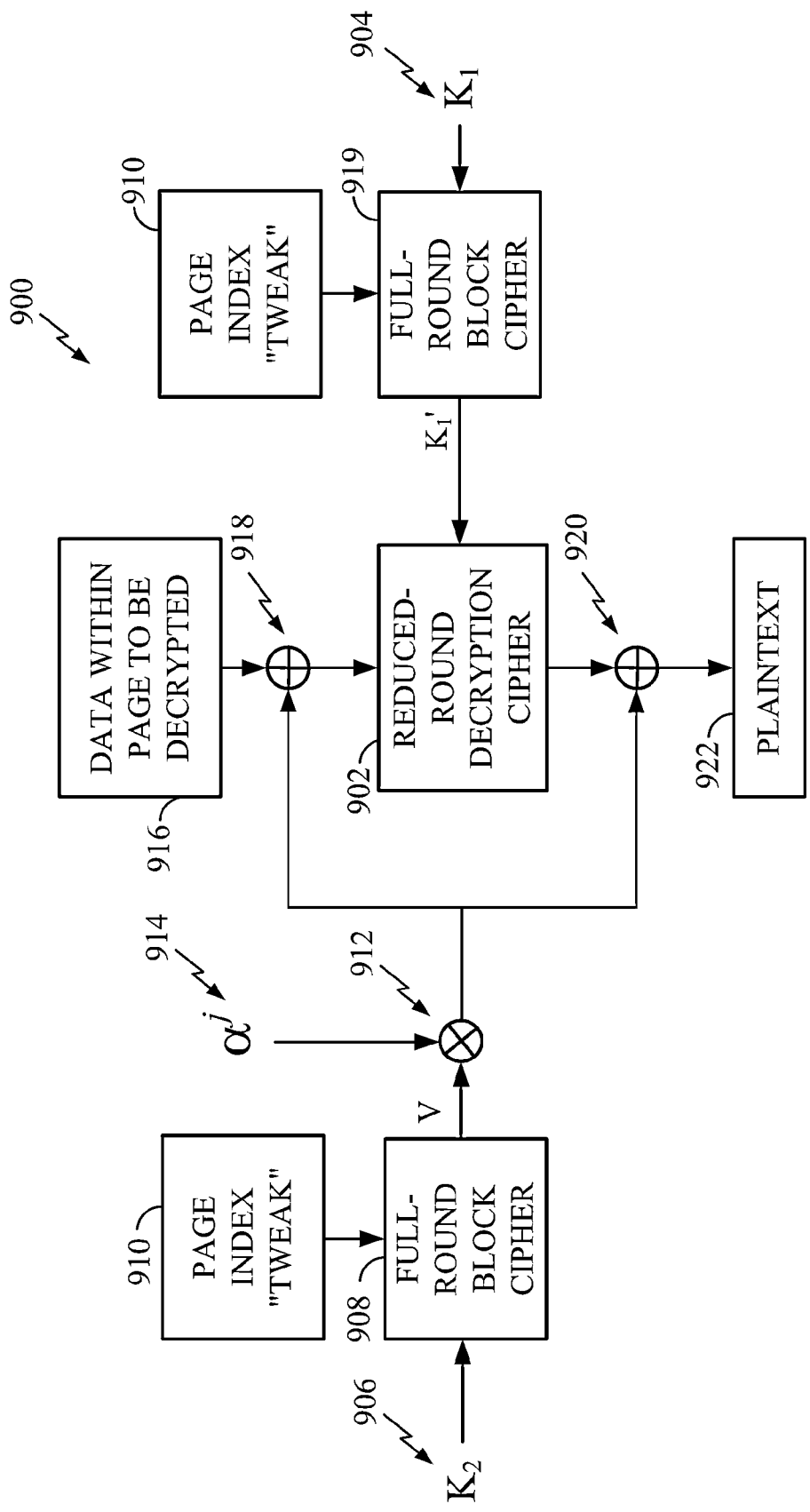
FIG. 9 further illustrates aspects of the decryption procedure of FIG. 8.

FIG. 9 illustrates an exemplary procedure 900 that may be employed in accordance with the method of FIG. 8 that uses a reduced-round decryption cipher 902 for decrypting data in combination with $K_1$ key 904 and $K_2$ key 906. In this mode, a full-round block cipher 908 is used to encrypt a 128-bit page index 910 under $K_2$ key 906. The output V of block cipher 908, which again may be regarded as a modified version of $K_2$, is multiplied at 912 with $\alpha^j$ 914 to provide an input/output whitening value, wherein $\alpha$ is a constant and j represents a block index (which may be an offset within the page of data to be decrypted.) Concurrently, the same page index 910 is also encrypted under key ($K_1$) using a full-round cipher 919, which can be the same form of cipher as full-round cipher 908. These procedures may be performed while data is being fetched for decryption. The fetched data to be decrypted 916 is then XORed at 918 with the whitening value and input to reduced-round decryption cipher 902 as whitened data. The output ($K_1$') of block cipher 919, which again may be regarded as a modified version of $K_1$, is employed as the key for reduced-round decryption cipher 902, as shown. That is, the whitened data is then decrypted under the modified version of $K_1$ by the reduced-round decryption cipher 902. The input/output whitening value generated by multiply function 912 is then XORed at 920 with the output data from the reduced-round decryption cipher to yield the final plaintext 922, which may be stored, for example, in an on-chip SRAM or otherwise processed within the device. Note that, in the example of FIG. 9, at least three processes may be performed in parallel: cipher instance with $K_1$ fires; cipher instance with $K_2$ fires, and ciphertext is fetched. This reduces read latency.

Exemplary System or Apparatus

Figure 10:
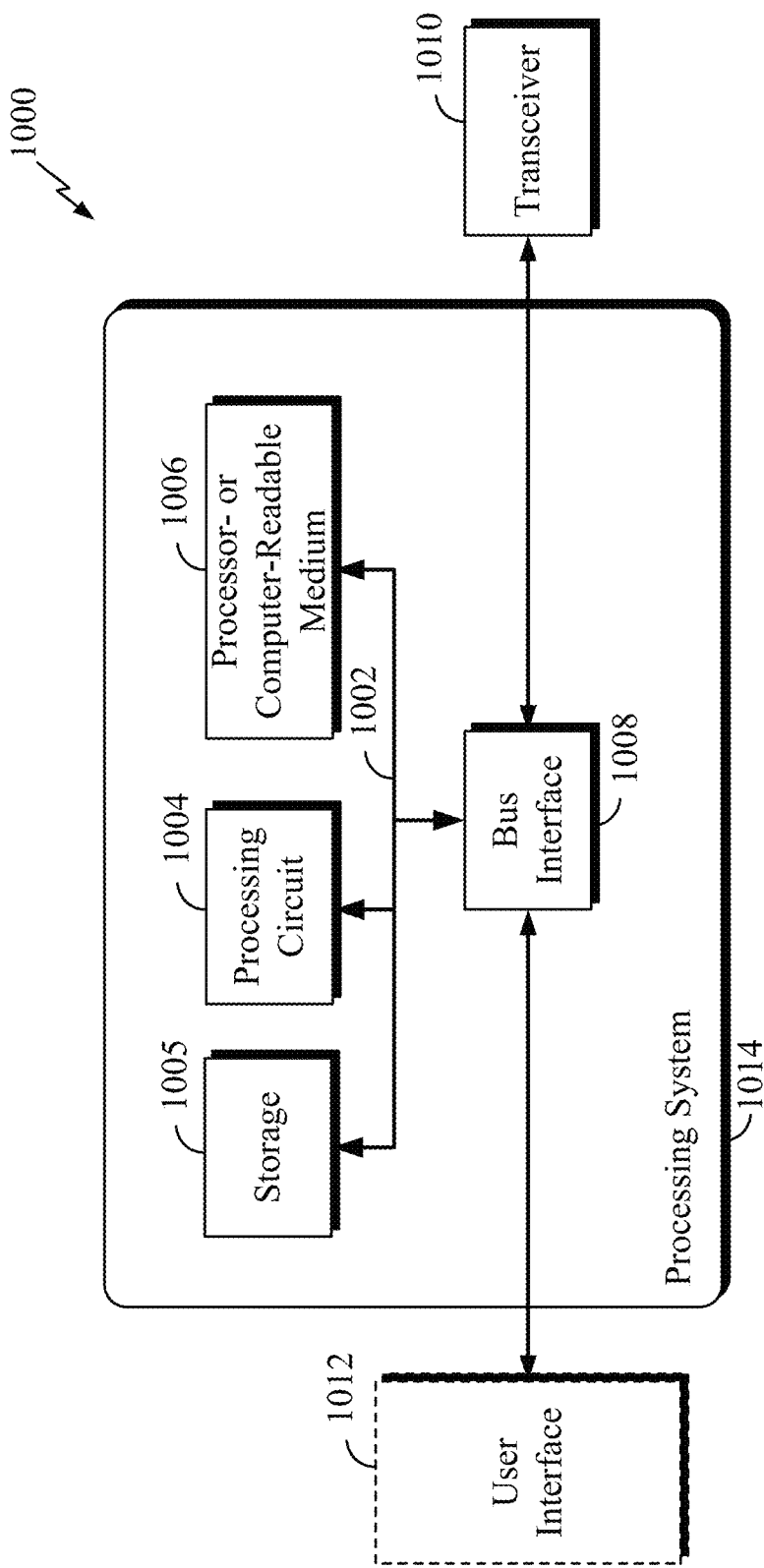
FIG. 10 is a block diagram illustrating an example of a hardware implementation for an apparatus employing a processing system that may exploit the systems and methods of FIGS. 1-9.

FIG. 10 illustrates an overall system or apparatus 1000 in which the components and methods of FIGS. 1-9 may be implemented. In accordance with various aspects of the disclosure, an element, or any portion of an element, or any combination of elements may be implemented with a processing system 1014 that includes one or more processing circuits 1004 such as the SoC processing circuit of FIG. 1. For example, apparatus 1000 may be a user equipment (UE) of a mobile communication system. Apparatus 1000 may be used with a radio network controller (RNC). In addition to an SoC, examples of processing circuits 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, processing circuit 1004, as utilized in apparatus 1000, may be used to implement any one or more of the processes described above and illustrated in FIGS. 1-9 (and those summarized in FIGS. 13-16, discussed below.) In particular, processing circuit 1004 may be configured to: encrypt a data unit index based on a first key using a first block cipher to generate or otherwise obtain a modified first key, wherein the data unit index corresponds to data to be encrypted by a reduced-round encryption cipher; encrypt the data based on the modified first key using the reduced-round encryption cipher; and store the encrypted data in the storage device. Processing circuit 1004 may be configured to: encrypt a data unit index based on a first key using a first block cipher to generate or otherwise obtain a modified first key, wherein the data unit index corresponds to data to be decrypted by a reduced-round decryption cipher; decrypt the data based on the modified first key using the reduced-round decryption cipher; and store the decrypted data in the storage device.

In this example, processing system 1014 may be implemented with a bus architecture, represented generally by the bus 1002. Bus 1002 may include any number of interconnecting buses and bridges depending on the specific application of processing system 1014 and the overall design constraints. Bus 1002 links together various circuits including one or more processing circuits (represented generally by the processing circuit 1004), storage device 1005, and processor-readable media (represented generally by a non-transitory processor- or computer-readable readable medium 1006). Bus 1002 may also link various other circuits such as timing sources, peripherals, voltage regulators, and power management circuits, which are well known in the art, and therefore, will not be described any further. Bus interface 1008 provides an interface between bus 1002 and a transceiver 1010. Transceiver 1010 provides a means for communicating with various other apparatus over a transmission medium. Depending upon the nature of the apparatus, a user interface 1012 (e.g., keypad, display, speaker, microphone, joystick) may also be provided.

Processor or processing circuit 1004 is responsible for managing bus 1002 and general processing, including the execution of software stored on the processor-readable medium 1006. The software, when executed by processing circuit 1004, causes processing system 1014 to perform the various functions described herein for any particular apparatus. Processor-readable medium 1006 may also be used for storing data that is manipulated by processing circuit 1004 when executing software. In particular, processor-readable storage medium 1006 may have one or more instructions which when executed by processing circuit 1004 causes processing circuit 1004 to: encrypt a data unit index under a first key using a first block cipher to generate or otherwise obtain a modified first key, wherein the data unit index corresponds to data to be encrypted by a reduced-round encryption cipher; encrypt the data under the modified first key using the reduced-round encryption cipher; and store the encrypted data in the storage device. Processor-readable storage medium 1006 may also have one or more instructions which when executed by processing circuit 1004 causes processing circuit 1004 to: encrypt a data unit index under a first key using a first block cipher to generate or otherwise obtain a modified first key, wherein the data unit index corresponds to data to be decrypted by a reduced-round decryption cipher; decrypt the data under the modified first key using the reduced-round decryption cipher; and store the decrypted data in the storage device.

One or more processing circuits 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The software may reside on computer-readable or processor-readable medium 1006. Processor-readable medium 1006 may be a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", and/or "processor-readable medium" may include, but are not limited to non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processing circuits, machines and/or devices. The processor-readable medium may also include, by way of example, a carrier wave, a transmission line, and any other suitable medium for transmitting software and/or instructions that may be accessed and read by a computer. Processor-readable medium 1006 may reside in processing system 1014, external to processing system 1014, or distributed across multiple entities including processing system 1014. Processor-readable medium 1006 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, step, feature or function or embodied in several components, steps, or functions. Additional elements, components, steps, and/or functions may also be added without departing from the aspects and features described. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessor, but in the alternative, the processing circuit may be any conventional processor, controller, microcontroller, or state machine. A processing circuit may also be implemented as a combination of computing components, e.g., a combination of a DSP and a microprocessor, a number of microprocessors, one or more microprocessors in conjunction with a DSP core, or any other such configuration.

Hence, in one aspect of the disclosure, processing circuit 100 and/or 1004 illustrated in FIGS. 1 and 10 may be a specialized processing circuit (e.g., an ASIC) that is specifically designed and/or hard-wired to perform the algorithms, methods, and/or steps described in FIGS. 2, 3, 5, 6, 8 and/or 9 (and/or FIGS. 13, 14, 15 and/or 16, discussed below.) Thus, such a specialized processing circuit (e.g., ASIC) may be one example of a means for executing the algorithms, methods, and/or steps described in FIGS. 2, 3, 5, 6, 8 and/or 9 (and/or FIGS. 13, 14, 15 and/or 16, discussed below.) The processor-readable storage medium may store instructions that when executed by a specialized processing circuit (e.g., ASIC) causes the specialized processing circuit to perform the algorithms, methods, and/or steps described herein.

Figure 11:
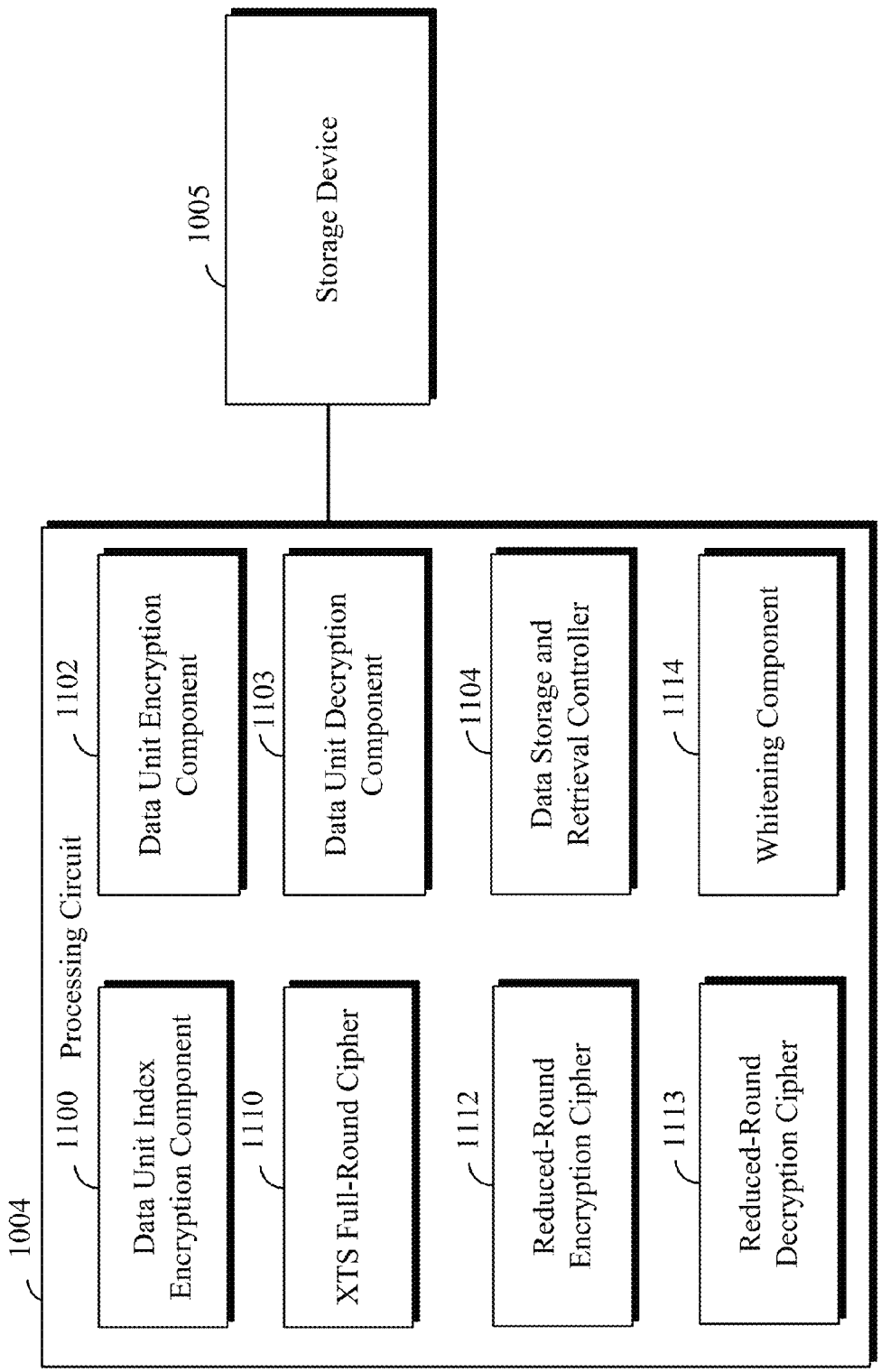
FIG. 11 is a block diagram illustrating device components of the processor of FIG. 10.

FIG. 11 illustrates selected and exemplary components of processing circuit 1004. In particular, processing circuit 1004 of FIG. 11 includes a data unit index encryption component 1100 operative to encrypt a data unit index based on a first key using a first block cipher (such as XTS full-round cipher 1110) to generate or otherwise obtain a dynamic, modified first key, wherein the data unit index corresponds to data to be encrypted or decrypted by a reduced-round cipher. Data unit index encryption component 1100 is further operative to encrypt the data unit index based on a second key using a second block cipher to obtain a modified second key. Processing circuit 1004 also includes a data unit encryption component 1102 operative to encrypt data based on the dynamic, modified first key using reduced-round encryption cipher 1112. Processing circuit 1004 also includes a data unit decryption component 1103 operative to decrypt previously encrypted data based on the dynamic, modified first key using reduced-round decryption cipher 1113. Processing circuit 1004 further includes a data storage and retrieval controller 1104 operative to store data that has been encrypted in a storage device and/or fetch data to be decrypted from a storage device, such as storage device 1005. The processing circuit 1004 may include additional components, such as a whitening component 1114 operative to apply a whitening key to the data to be encrypted or decrypted prior to applying the data to the respective reduced-round ciphers and then re-apply the whitening key to outputs of the reduced-round ciphers.

Figure 12:
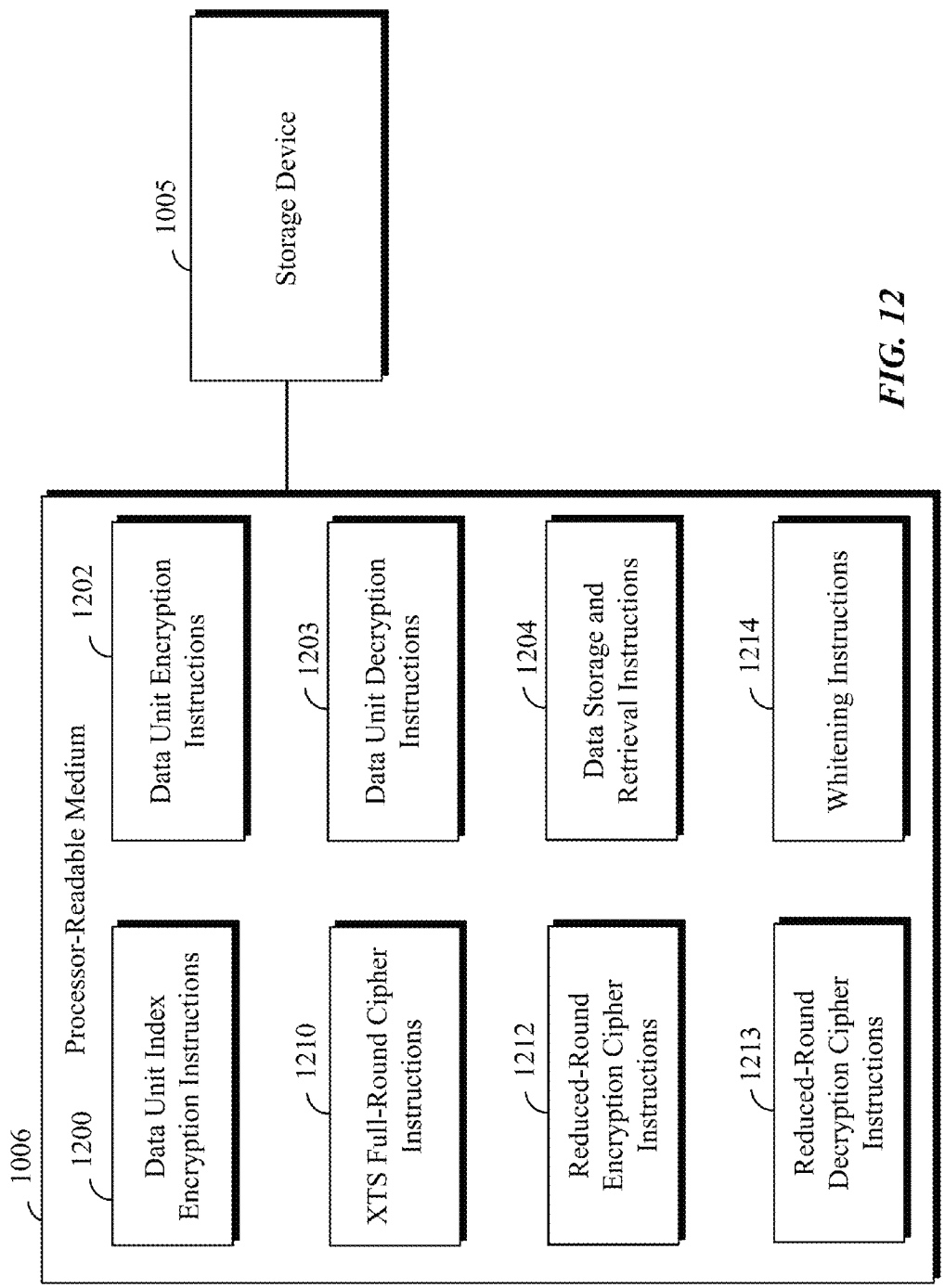
FIG. 12 is a block diagram illustrating instruction components of the processor-readable medium of FIG. 10.

FIG. 12 illustrates selected and exemplary instruction components of processor-readable or computer-readable medium 1006. In particular, processor-readable medium 1006 of FIG. 12 includes data unit index encryption instructions 1200, which when executed by the processing circuit of FIG. 8 causes the processing circuit to encrypt a data unit index based on a first key using a first block cipher to generate or otherwise obtain a dynamic, modified first key, wherein the data unit index corresponds to data to be encrypted by a reduced-round encryption cipher. Processor-readable medium 1006 also includes data unit encryption instructions 1202 operative to encrypt the data based on the dynamic, modified first key using a reduced-round encryption cipher. Processor-readable medium 1006 also includes data unit decryption instructions 1203 operative to decrypt previously encrypted data based on the dynamic, modified first key using a reduced-round decryption cipher. Processor-readable medium 1006 further includes data storage and retrieval instructions 1204 operative to store data that has been encrypted in a storage device and/or fetch data to be decrypted from a storage device, such as storage device 1205. The processor-readable medium 1006 may include additional instructions, such as XTS full-round cipher instructions 1210, reduced-round encryption cipher instructions 1212 and reduced-round decryption cipher instructions 1213, as well as whitening instructions 1214 operative to apply a whitening key to the data to be encrypted/decrypted prior to applying the data to the respective reduced-round ciphers and then re-apply the whitening key to output of the reduced-round ciphers. Other instructions may be provided as well and the illustration of FIG. 12 is by no means exhaustive.

Figure 13:
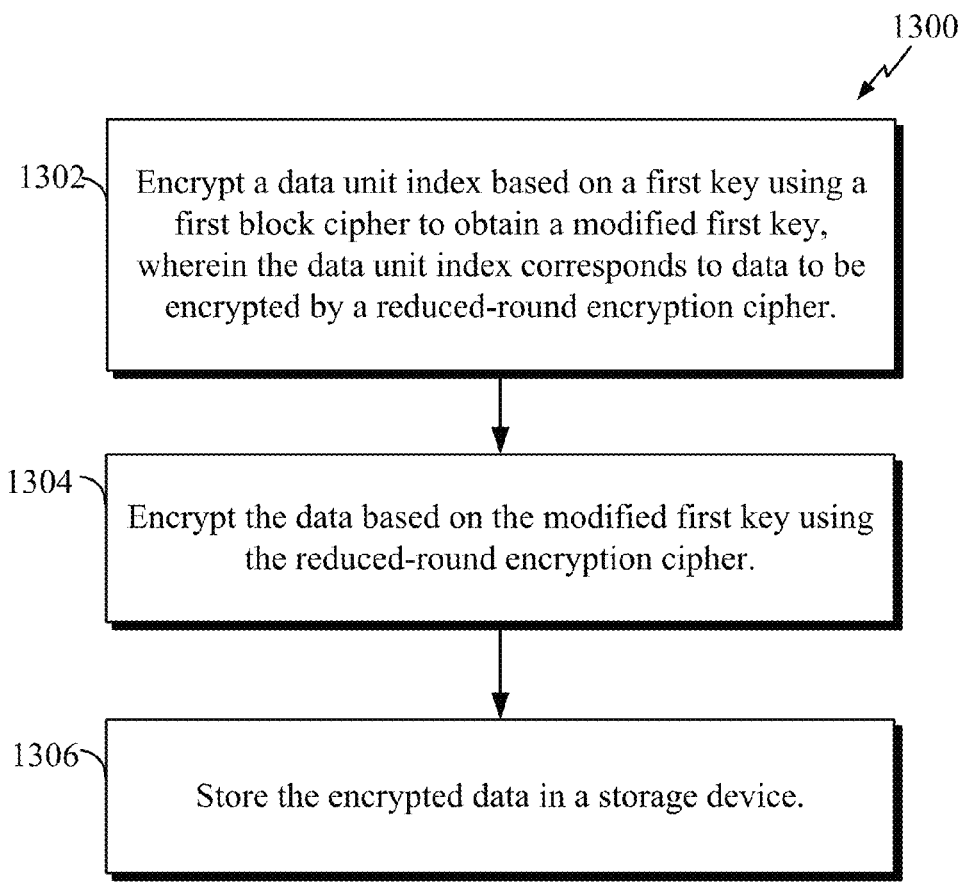
FIG. 13 summarizes an encryption procedure that may be performed by the components of FIGS. 10-12.

FIG. 13 summarizes an encryption method 1300 for use with a reduced-round encryption cipher that may be performed, for example, by the processing circuit of FIG. 11 or other suitably-equipped devices. Briefly, at step 1302, the processing circuit encrypts a data unit index based on a first key using a first block cipher to obtain a modified first key, wherein the data unit index corresponds to data to be encrypted by a reduced-round encryption cipher, i.e. the data unit index identifies a memory storage location containing data to be encrypted. At step 1304, the processing circuit encrypts the data based on the modified first key using the reduced-round encryption cipher. At step 1306, the processing circuit stores the encrypted data in a storage device.

Figure 14:
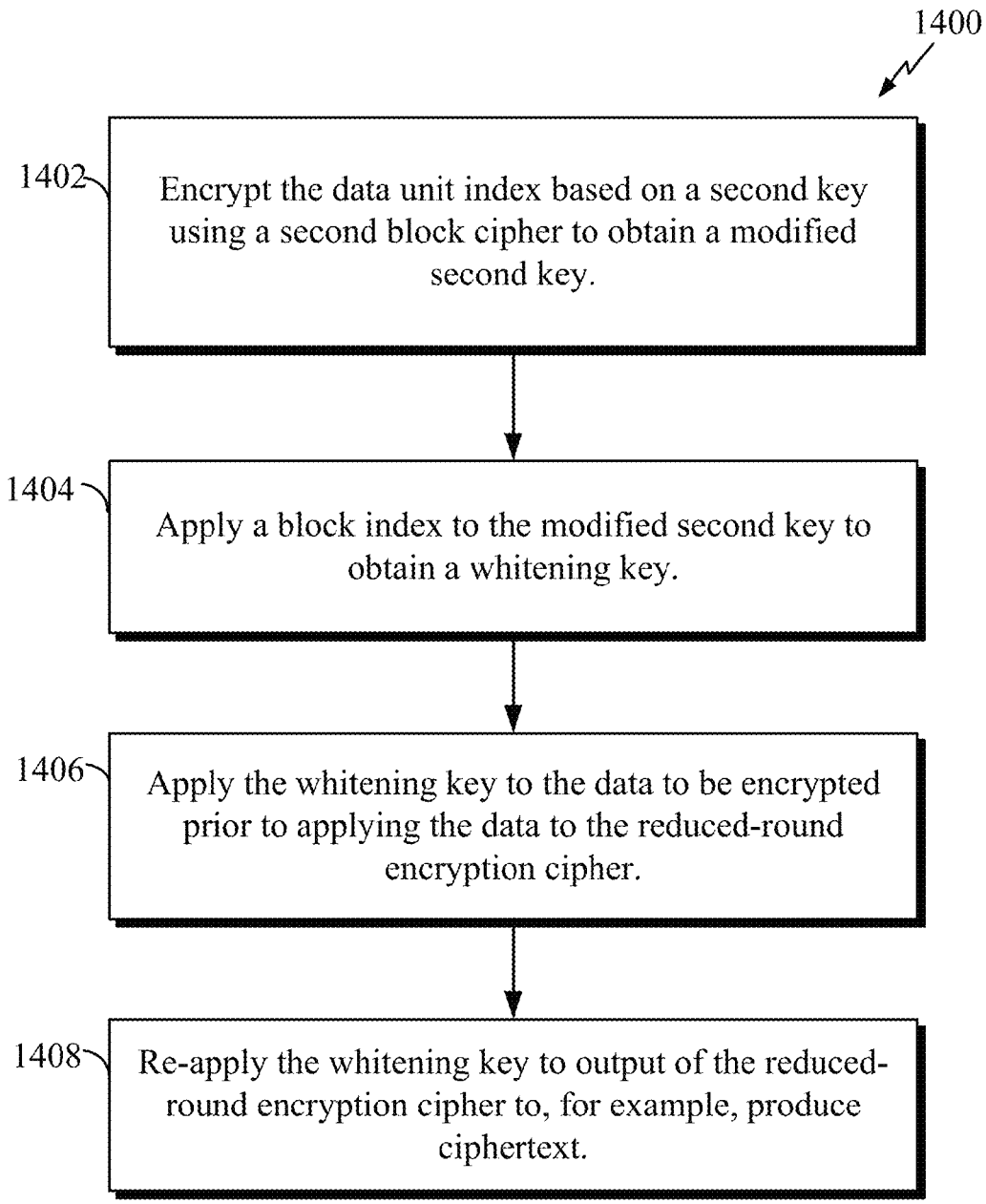
FIG. 14 further summarizes aspects of the encryption procedure of FIG. 13.

FIG. 14 summarizes further procedures 1400 for use with a reduced-round encryption cipher that also may be performed, for example, by the processing circuit of FIG. 11 or other suitably-equipped devices. Briefly, at step 1402, the processing circuit encrypts the data unit index based on a second key using a second block cipher to obtain a modified second key. At step 1404, the processing circuit applies a block index to the modified second key to obtain a whitening key. At step 1406, the processing circuit applies the whitening key to the data to be encrypted prior to applying the data to the reduced-round encryption cipher. At step 1408, the processing circuit re-applies the whitening key to output of the reduced-round encryption cipher to, e.g., produce ciphertext.

Figure 15:
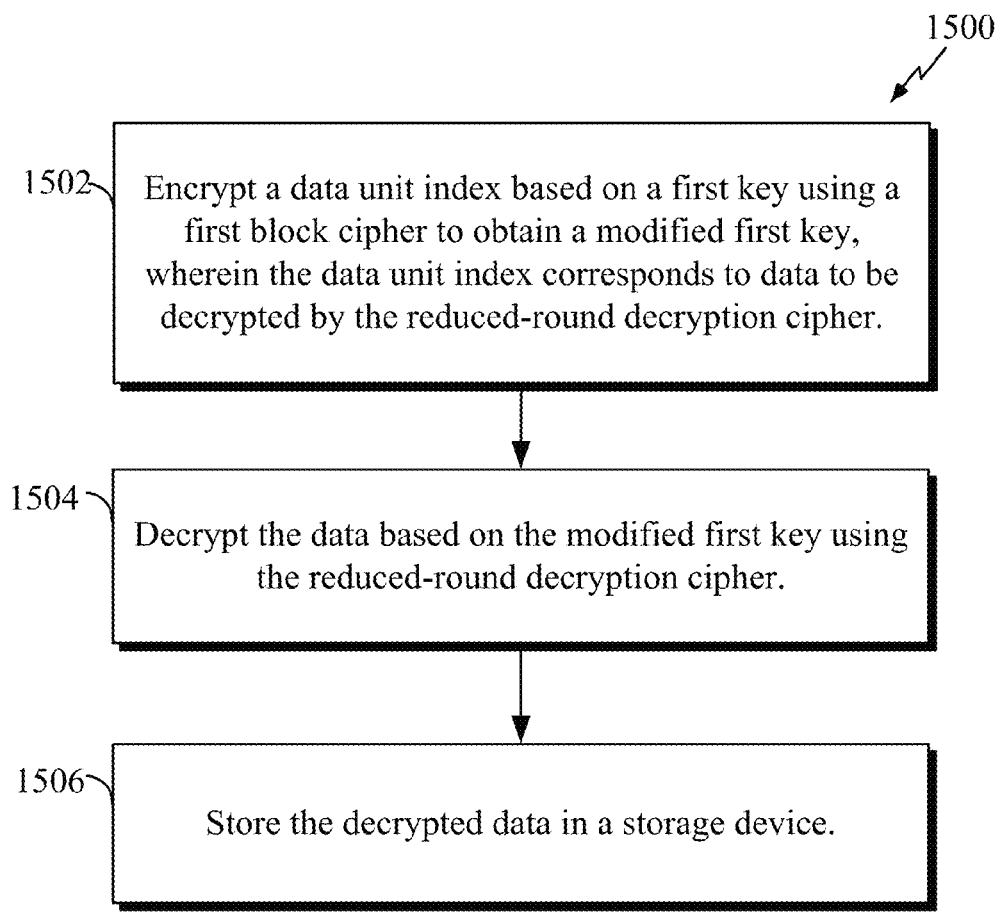
FIG. 15 summarizes a decryption procedure that may be performed by the components of FIGS. 10-12.

FIG. 15 summarizes a decryption method 1500 for use with a reduced-round decryption cipher that also may be performed, for example, by the processing circuit of FIG. 11 or other suitably-equipped devices. Briefly, at step 1502, the processing circuit encrypts a data unit index based on a first key using a first block cipher to obtain a modified first key, wherein the data unit index corresponds to data to be decrypted by a reduced-round decryption cipher, i.e. the data unit index identifies a memory storage location containing data to be decrypted. At step 1504, the processing circuit decrypts the data based on the modified first key using the reduced-round decryption cipher. At step 1506, the processing circuit stores the decrypted data in a storage device.

Figure 16:
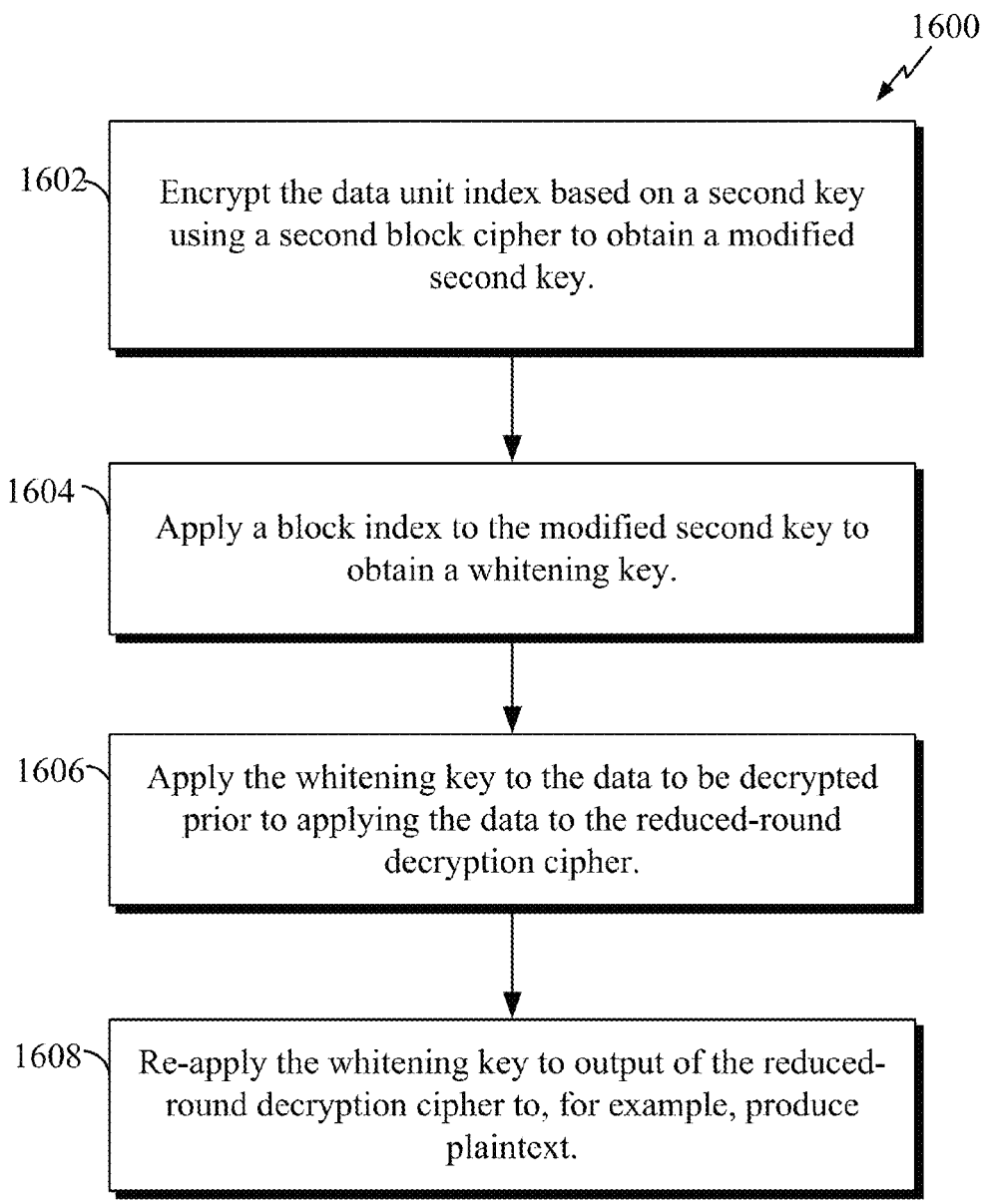
FIG. 16 further summarizes aspects of the decryption procedure of FIG. 15.

FIG. 16 summarizes further procedures 1600 for use with a reduced-round decryption cipher that also may be performed, for example, by the processing circuit of FIG. 11 or other suitably-equipped devices. Briefly, at step 1602, the processing circuit encrypts the data unit index based on a second key using a second block cipher to obtain a modified second key. At step 1604, the processing circuit applies a block index to the modified second key to obtain a whitening key. At step 1606, the processing circuit applies the whitening key to the data to be decrypted prior to applying the data to the reduced-round decryption cipher. At step 1608, the processing circuit re-applies the whitening key to output of the reduced-round decryption cipher to, e.g., produce plaintext.

Also, it is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It is contemplated that various features described herein may be implemented in different systems. It should be noted that the foregoing aspects of the disclosure are merely examples and are not to be construed as limiting. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for encrypting data for use with a reduced-round encryption block cipher processing device, comprising:

encrypting a data unit index based on a first key using a first block cipher to obtain a modified first key, wherein the data unit index is an n-bit index corresponding to a page of data to be encrypted by the reduced-round encryption block cipher processing device;

encrypting the data unit index based on a second key using a second block cipher to obtain a modified second key;

applying the modified second key to the data to modify the data;

encrypting the modified data based on the modified first key using the reduced-round encryption block cipher processing device to obtain encrypted data; and storing the encrypted data in an electronic storage device.

2. The method of claim 1, wherein applying the modified second key to the data to modify the data further comprises:

applying a block index to the modified second key to obtain a whitening key; and applying the whitening key to the data to be encrypted prior to applying the data to the reduced-round encryption block cipher processing device; and wherein encrypting the modified data further comprises re-applying the whitening key to an output of the reduced-round encryption block cipher processing device to obtain the encrypted data.

3. The method of claim 1, wherein the first and second block ciphers are full block ciphers.

4. The method of claim 1, wherein the data unit index is applied to the first and second block ciphers where n is a block size of the first and second block ciphers.

5. The method of claim 2, wherein applying the block index to the modified second key to obtain the whitening key comprises multiplying the modified second key with $\alpha^j$ wherein $\alpha$ is a constant and j is the block index.

6. The method of claim 5 wherein applying the whitening key to the data prior to applying the data to the reduced-round encryption block cipher processing device comprises XORing the whitening key with the data.

7. The method of claim 6, wherein re-applying the whitening key to the output of the reduced-round encryption block cipher processing device comprises XORing the whitening key with data output from the reduced-round encryption block cipher processing device.

8. The method of claim 1, wherein the data unit index corresponds to a page number.

9. The method of claim 1, wherein the reduced-round encryption block cipher processing device is implemented within a system-on-a-chip device coupled to an off-chip storage device and further comprising storing encrypted data in the off-chip storage device.

10. The method of claim 1, wherein encrypting the data unit index based on the first key using the first block cipher to obtain the modified first key and encrypting the data unit index based on the second key using the second block cipher to obtain the modified second key are operations performed in parallel.

11. The method of claim 10, wherein the operations performed in parallel further comprise: encrypting the data unit index under the first key, where n is the block size of the reduced-round decryption block cipher processing device; and encrypting the n-bit data unit index under the second key to obtain the modified second key.

12. A device comprising:
an electronic storage device to store data;
a processing circuit coupled to the storage device, the processing circuit configured to
encrypt a data unit index based on a first key using a first block cipher to obtain a modified first key, wherein the data unit index is an n-bit index corresponding to a page of data to be encrypted by a reduced-round encryption block cipher processing device;
encrypt the data unit index based on a second key using a second block cipher to obtain a modified second key;
apply the modified second key to the data to modify the data;
encrypt the modified data based on the modified first key using the reduced-round encryption block cipher processing device to obtain encrypted data; and
store the encrypted data in the storage device.

13. The device of claim 12, wherein the processing circuit is configured to apply the modified second key to the data to modify the data by:
applying a block index to the modified second key to obtain a whitening key; and
applying the whitening key to the data to be encrypted prior to applying the data to the reduced-round encryption block cipher; and wherein the processing circuit is further configured to re-apply the whitening key to an output of the reduced-round encryption block cipher processing device to obtain the encrypted data.

14. The device of claim 12, wherein the first and second block ciphers used by the processing circuit are full block ciphers.

15. The device of claim 12, wherein the data unit index used by the processing circuit is applied to the first and second block ciphers where n is a block size of the first and second block ciphers.

16. The device of claim 13, wherein the processing circuit is further configured to apply the block index to the modified second key to obtain the whitening key by multiplying the modified second key with $\alpha^j$ wherein $\alpha$ is a constant and j is the block index.

17. The device of claim 16, wherein the processing circuit is further configured to apply the whitening key to the data prior to applying the data to the reduced-round encryption block cipher processing device by XORing the whitening key with the data.

18. The device of claim 17, wherein the processing circuit is further configured to re-apply the whitening key to the output of the reduced-round encryption block cipher processing device by XORing the whitening key with data output from the reduced-round encryption block cipher processing device.

19. The device of claim 12, wherein the data unit index used by the processing circuit is a page number.

20. The device of claim 12, wherein the processing circuit is a component of a system-on-a-chip device coupled to an off-chip storage device and the processing circuit is further configured to store encrypted data in the off-chip storage device.

21. The device of claim 12, wherein the processing circuit is further configured to encrypt the data unit index based on the first key using the first block cipher to obtain the modified first key and encrypt the data unit index based on the second key using the second block cipher to obtain the modified second key in parallel operations.

22. The device of claim 21, wherein the operations performed in parallel by the processing circuit further comprise: encrypting the data unit index under the first key, where n is the block size of the reduced-round decryption block cipher processing device; and encrypting the n-bit data unit index under the second key to obtain the modified second key.

23. A method for decrypting data for use with a reduced-round decryption block cipher processing device, comprising:
encrypting a data unit index based on a first key using a first block cipher to obtain a modified first key, wherein the data unit index is an n-bit index corresponding to a page of data to be decrypted by the reduced-round decryption block cipher processing device;
encrypting the data unit index based on a second key using a second block cipher to obtain a modified second key;
applying the modified second key to the data to modify the data;
decrypting the modified data based on the modified first key using the reduced-round decryption block cipher processing device to obtain decrypted data; and
storing the decrypted data in an electronic storage device.

24. The method of claim 23, wherein applying the modified second key to the data to modify the data further comprises:
applying a block index to the modified second key to obtain a whitening key; and applying the whitening key to the data to be decrypted prior to applying the data to the reduced-round decryption block cipher processing device; and wherein decrypting the modified data further comprises re-applying the whitening key to an output of the reduced-round decryption cipher processing device to obtain the decrypted data.

25. The method of claim 23, wherein the first and second block ciphers are full block ciphers.

26. The method of claim 23, further comprising obtaining data to be decrypted from a storage device and wherein encrypting the data unit index based on the first key using the first block cipher to obtain the modified first key and encrypting the data unit index based on the second key using the second block cipher to obtain the modified second key are both performed in parallel with operations to obtain the data to be decrypted by the reduced-round decryption block cipher processing device.

27. The method of claim 26, wherein obtaining the data to be decrypted comprises fetching the data from the storage device and wherein, while the data is being fetched: the data unit index is encrypted under the first key, where n is the block size of the reduced-round decryption block cipher processing device; the n-bit data unit index is encrypted under the second key to obtain the modified second key; and a block index is applied to the modified second key to generate a whitening key, wherein the block index is an offset within a page of data to be decrypted.

28. A device comprising:
an electronic storage device to store data;
a processing circuit coupled to the storage device, the processing circuit configured to
encrypt a data unit index based on a first key using a first block cipher to obtain a modified first key, wherein the data unit index is an n-bit index corresponding to a page of data to be decrypted by a reduced-round decryption block cipher processing device;
encrypt the data unit index based on a second key using a second block cipher to obtain a modified second key;
apply the modified second key to the data to modify the data;
decrypt the modified data based on the modified first key using the reduced-round decryption block cipher processing device to obtain decrypted data; and
store the decrypted data in a storage device.

29. The device of claim 28, wherein the processing circuit is configured to apply the modified second key to the data to modify the data by:
applying a block index to the modified second key to obtain a whitening key;
applying the whitening key to the data to be decrypted prior to applying the data to the reduced-round decryption block cipher processing device; and
wherein the processing circuit is further configured to re-apply the whitening key to an output of the reduced-round decryption block cipher processing device to obtain the decrypted data.

30. The device of claim 28, wherein the first and second block ciphers used by the processing circuit are full block ciphers.

31. The device of claim 28, wherein the processing circuit is further configured to obtain data to be decrypted from a storage device and wherein encrypting the data unit index based on the first key using the first block cipher to obtain the modified first key and encrypting the data unit index based on the second key using the second block cipher to obtain the modified second key are both performed in parallel with operations to obtain the data to be decrypted by the reduced-round decryption block cipher processing device.

32. The device of claim 31, wherein the processing circuit is further configured to obtain the data to be decrypted by fetching the data from the storage device and wherein, while the data is being fetched: the data unit index is encrypted by the processing circuit under the first key, where n is the block size of the reduced-round decryption block cipher processing device; the n-bit data unit index is encrypted by the processing circuit under the second key to obtain the modified second key; and a block index is applied to the modified second key to generate a whitening key, wherein the block index is an offset within a page of data to be decrypted.

\* \* \* \* \*